US012121965B2

(12) United States Patent
Fujita et al.

(10) Patent No.: US 12,121,965 B2
(45) Date of Patent: Oct. 22, 2024

(54) SILICON-OXIDE-COATED SOFT MAGNETIC POWDER, AND METHOD FOR MANUFACTURING SAME

(71) Applicant: DOWA ELECTRONICS MATERIALS CO., LTD., Tokyo (JP)

(72) Inventors: Hidefumi Fujita, Tokyo (JP); Koji Tanoue, Tokyo (JP); Keisuke Yamada, Tokyo (JP); Tetsuya Kawahito, Tokyo (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 0 days.

(21) Appl. No.: 17/773,865

(22) PCT Filed: Nov. 19, 2020

(86) PCT No.: PCT/JP2020/043268
§ 371 (c)(1),
(2) Date: May 3, 2022

(87) PCT Pub. No.: WO2021/106752
PCT Pub. Date: Jun. 3, 2021

(65) Prior Publication Data
US 2022/0392676 A1 Dec. 8, 2022

(30) Foreign Application Priority Data
Nov. 27, 2019 (JP) ................................ 2019-214326

(51) Int. Cl.
*B22F 1/00* (2022.01)
*B22F 1/14* (2022.01)
(Continued)

(52) U.S. Cl.
CPC ............ *B22F 1/16* (2022.01); *H01F 1/14766* (2013.01); *B22F 2301/35* (2013.01); *B22F 2302/256* (2013.01)

(58) Field of Classification Search
CPC .......... B22F 1/16; B22F 1/05; B22F 2301/15; B22F 2302/256; B22F 2304/10;
(Continued)

(56) References Cited

U.S. PATENT DOCUMENTS

2016/0276078 A1* 9/2016 Pagano .................... B22F 1/16

FOREIGN PATENT DOCUMENTS

JP 2005286315 A * 10/2005
JP 2008028162 A * 2/2008
(Continued)

*Primary Examiner* — Kevin CT Li
(74) *Attorney, Agent, or Firm* — Bauer & Joseph

(57) ABSTRACT

A silicon oxide-coated soft magnetic powder, in which the ratio of a volume-based cumulative 50% particle diameter D50 (HE) according to a dry laser diffraction particle size distribution analysis to the same particle diameter D50 (MT) according to a wet laser diffraction particle size distribution analysis is 0.7 or more, and a coverage ratio R defined by $R=Si\times100/(Si+M)$ (Si and M are molar fractions of Si and elements constituting the soft magnetic powder) is 70% or more is obtained by subjecting a slurry containing a soft magnetic powder containing 20 mass % or more of iron and a hydrolysate of a silicon alkoxide to a dispersion treatment when the surface of the soft magnetic powder is coated with the hydrolysate in a mixed solvent of water and an organic substance. The powder has good insulation/dispersibility properties and a high filling factor during molding.

1 Claim, 4 Drawing Sheets

(51) Int. Cl.
*B22F 1/16* (2022.01)
*H01F 1/147* (2006.01)

(58) Field of Classification Search
CPC ......... C22C 19/03; C22C 38/00; C22C 38/02; C22C 38/06; C22C 38/08; C22C 38/18; C22C 33/02; C22C 45/02; H01F 1/147; H01F 1/24; H01F 1/22; C23C 18/1254; C23C 1/1216
See application file for complete search history.

(56) References Cited

FOREIGN PATENT DOCUMENTS

| | | | |
|---|---|---|---|
| JP | 2009-231481 | 10/2009 | |
| JP | 2019-123933 | 7/2019 | |
| JP | 2019-143241 | 8/2019 | |
| WO | WO-2016132696 A1 * | 8/2016 | ................ B22F 3/00 |

* cited by examiner

[Fig.1]
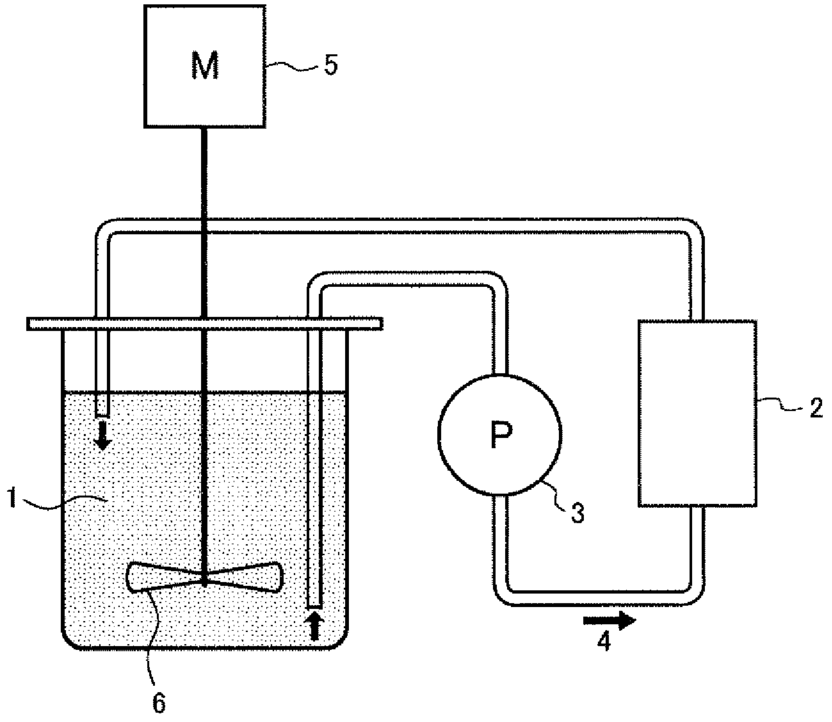
[Fig.2]
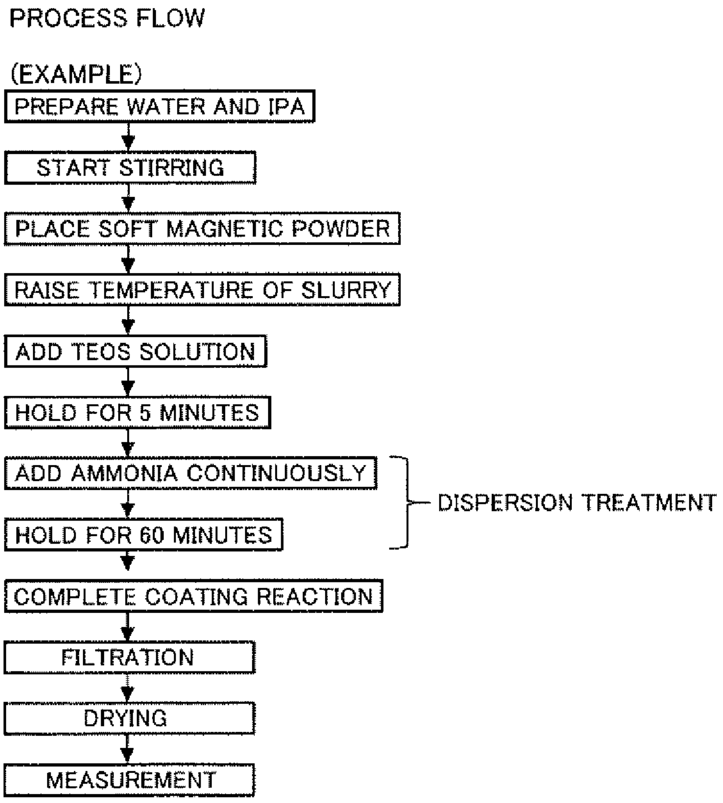

[Fig.3]
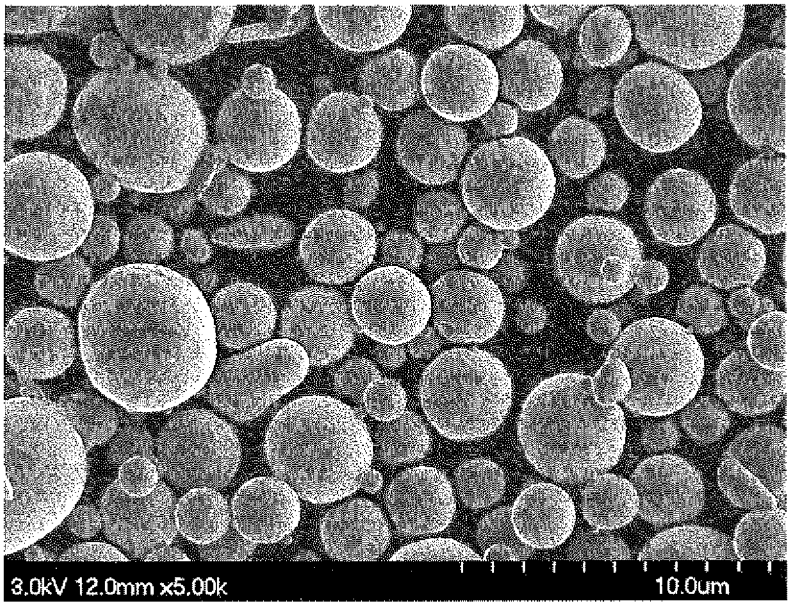
[Fig.4]
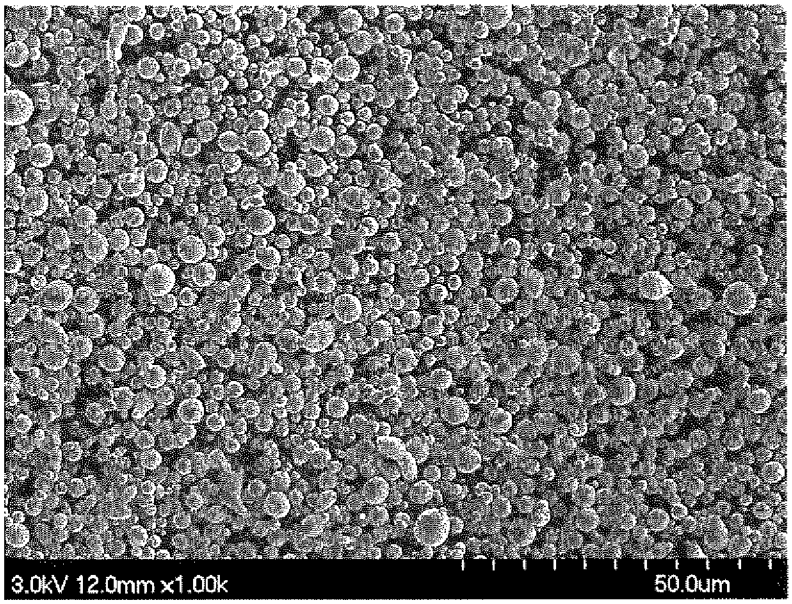

[Fig.5]
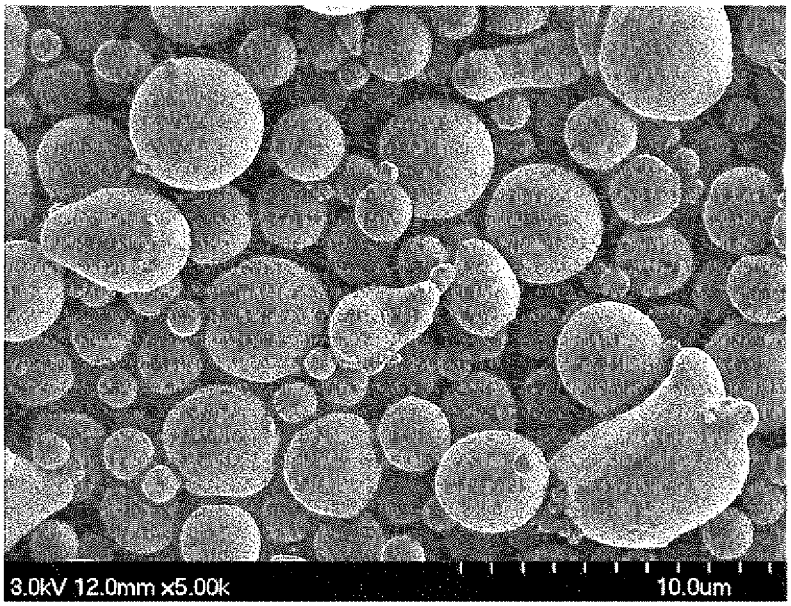
[Fig.6]
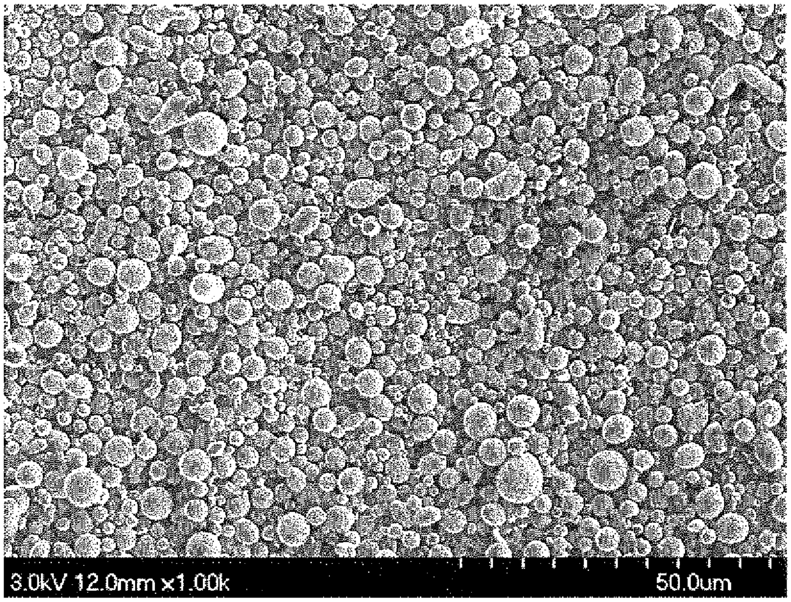

[Fig.7]
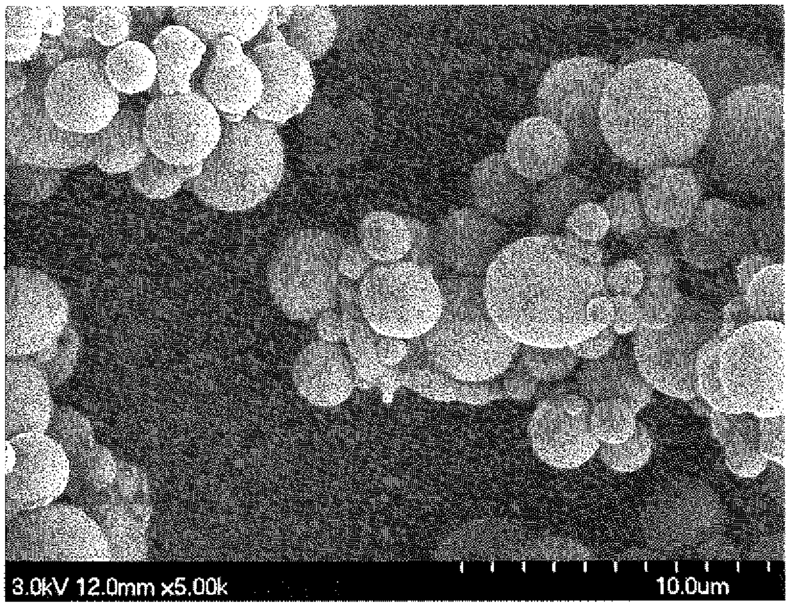
[Fig.8]
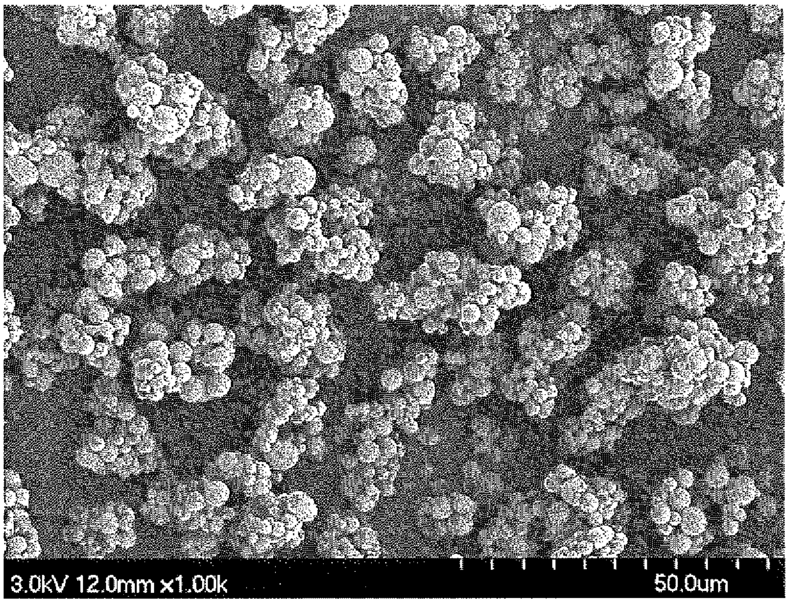

SILICON-OXIDE-COATED SOFT MAGNETIC POWDER, AND METHOD FOR MANUFACTURING SAME

TECHNICAL FIELD

The present invention relates to a silicon oxide-coated soft magnetic powder having a good insulation property and a high magnetic permeability (μ) suitable for manufacturing a powder compact magnetic core of an electrical or electronic part such as an inductor, a choke coil, a transformer, a reactor, or a motor, and a method for manufacturing the same.

BACKGROUND ART

Conventionally, as a magnetic core of an inductor, a choke coil, a transformer, a reactor, a motor, or the like, a powder compact magnetic core using a soft magnetic powder such as an iron powder, an alloy powder or an intermetallic compound powder containing iron is known. However, the powder compact magnetic core using such a soft magnetic powder containing iron has a lower electrical resistivity than a powder compact magnetic core using ferrite, and therefore is manufactured by coating the surface of the soft magnetic powder with an insulating film, followed by compression molding and a heat treatment. Further, with the miniaturization of an inductor or the like, the refinement of the soft magnetic powder which is a material constituting a magnetic core is also required.

Various types of insulating coatings have been conventionally proposed, and a silicon oxide coating is known as a highly insulating coating. As a soft magnetic powder coated with silicon oxide, for example, PTL 1 discloses a technique in which an Fe-6.5% Si powder having an average particle diameter of 80 μm is coated with a hydrolysate of tetraethoxysilane using an IPA (isopropanol) solution of tetraethoxysilane, followed by drying at 120° C. However, a silicon oxide coating layer obtained by the technique disclosed in PTL 1 had many defects, and a soft magnetic powder to become a core did not satisfy the above-mentioned requirement for refinement of the soft magnetic powder.

Further, the present applicant discloses, as a technique for improving the technique disclosed in PTL 1, a technique for applying a silicon oxide coating having an average film thickness of 1 nm or more and 30 nm or less and a coverage ratio of 70% or more on a soft magnetic powder having a volume-based cumulative 50% particle diameter $D_{50}$ obtained by a laser diffraction particle size distribution analysis of 1.0 μm or more and 5.0 μm or less using a silicon alkoxide in PTL 2.

CITATION LIST

Patent Literature

PTL 1: JP-A-2009-231481
PTL 2: JP-A-2019-143241

SUMMARY OF INVENTION

Technical Problem

However, it was found out that there is room for improvement in the technique described in the above PTL 2.

In the case where the surface of a refined soft magnetic powder is coated with silicon oxide by hydrolyzing a silicon alkoxide, even when a soft magnetic powder with good dispersibility in water is used, primary particles aggregate at the time of coating with silicon oxide and coarse secondary particles are sometimes foisted. In the case where a powder compact magnetic core is produced, if aggregating coarse particles are contained in a silicon oxide-coated soft magnetic powder, the filling property may deteriorate when a green compact is formed for forming a magnetic core.

The filling property of a silicon oxide-coated soft magnetic powder when molding a green compact can also be improved by disintegrating coarse secondary particles in the silicon oxide-coated soft magnetic powder using a dry pulverizing means, however, in the case of using the disintegration method, a silicon oxide coating layer is peeled off by a physical impact, and there arises a problem that a soft magnetic powder serving as a core is partially exposed. When the soft magnetic powder serving as a core is exposed, there is a problem that when heat is applied to a powder compact magnetic core, the resistance of the green compact decreases and the magnetic properties such as iron loss deteriorate.

In view of the above problems, an object of the present invention is to provide a silicon oxide-coated soft magnetic powder having a silicon oxide coating with few defects so as to have an excellent insulation property, and capable of obtaining a high filling factor when molding a green compact, and a method for manufacturing the same.

Solution to Problem

In order to achieve the above object, the following inventions are disclosed in the present description.

[1] A silicon oxide-coated soft magnetic powder, in which the surface of a soft magnetic powder containing 20 mass % or more of iron is coated with silicon oxide, wherein when a volume-based cumulative 50% particle diameter obtained by a laser diffraction particle size distribution analysis in a state where the silicon oxide-coated soft magnetic powder is dispersed in a gas under the condition of 0.5 MPa is represented by D50 (HE) and a volume-based cumulative 50% particle diameter obtained by a laser diffraction/scattering particle size distribution analysis in a state where the silicon oxide-coated soft magnetic powder is dispersed in pure water is represented by D50 (MT), the D50 (HE) is 0.1 μm or more and 10.0 μm or less and D50 (HE)/D50 (MT) is 0.7 or more, and the coverage ratio R of a silicon oxide coating layer defined by the following formula (1) is 70% or more:

$$R = Si \times 100/(Si + M) \quad (1)$$

wherein Si is a molar fraction of Si obtained by X-ray photoelectron spectroscopy (XPS) measurement for the silicon oxide-coated soft magnetic powder, and M is the sum of molar fractions obtained by XPS measurement for metal elements and non-metal elements excluding oxygen among the elements constituting the soft magnetic powder.

[2] The silicon oxide-coated soft magnetic powder according to the above [1], wherein the average film thickness of the silicon oxide coating layer is 1 nm or more and 30 nm or less.

[3] The silicon oxide-coated soft magnetic powder according to the above [1] or [2], wherein the tap density of the silicon oxide-coated soft magnetic powder is 3.0 (g/cm$^3$) or more and 5.0 (g/cm$^3$) or less.

[4] The silicon oxide-coated soft magnetic powder according to any one of the above [1] to [3], wherein the ratio of the tap density to the D50 (MT) (tap density $(g/cm^3)$/D50 (MT) (μm)) is 0.5 $(g/cm^3)/(\mu m)$ or more and 5.0 $(g/cm^3)/(\mu m)$ or less.

[5] A method for manufacturing a silicon oxide-coated soft magnetic powder, in which the surface of a soft magnetic powder containing 20 mass % or more of iron is coated with silicon oxide, including:

- a step of mixing water and an organic solvent, thereby preparing a mixed solvent containing water in an amount of 1 mass % or more and 40 mass % or less;
- a slurry production step of adding a soft magnetic powder containing 20 mass % or more of iron to the mixed solvent, thereby obtaining a slurry in which the soft magnetic powder is dispersed;
- an alkoxide addition step of adding a silicon alkoxide to the slurry in which the soft magnetic powder is dispersed;
- a hydrolysis catalyst addition step of adding a hydrolysis catalyst for the silicon alkoxide to the slurry in which the soft magnetic powder is dispersed and the silicon alkoxide is added and obtaining a slurry in which the soft magnetic powder coated with a silicon compound is dispersed while performing a dispersion treatment; and
- a step of subjecting the slurry in which the soft magnetic powder coated with the silicon compound is dispersed to solid-liquid separation, thereby obtaining the soft magnetic powder coated with the silicon compound.

[6] The method for manufacturing a silicon oxide-coated soft magnetic powder according to the above [5], wherein a method for the dispersion treatment in the hydrolysis catalyst addition step is a high-pressure homogenizer or a high-speed stirring mixer.

Advantageous Effects of Invention

By using the manufacturing method of the present invention, a silicon oxide-coated soft magnetic powder having an excellent insulation property and capable of obtaining a high filling factor when molding a green compact can be produced.

BRIEF DESCRIPTION OF DRAWINGS

FIG. 1 is a conceptual view of a reactor for carrying out the present invention.

FIG. 2 is a flowchart of a reaction in Example 1.

FIG. 3 is an SEM photograph of a soft magnetic powder used in Example 1.

FIG. 4 is an SEM photograph of the soft magnetic powder used in Example 1.

FIG. 5 is an SEM photograph of a silicon oxide-coated soft magnetic powder obtained in Example 2.

FIG. 6 is an SEM photograph of the silicon oxide-coated soft magnetic powder obtained in Example 2.

FIG. 7 is an SEM photograph of a silicon oxide-coated soft magnetic powder obtained in Comparative Example 2.

FIG. 8 is an SEM photograph of the silicon oxide-coated soft magnetic powder obtained in Comparative Example 2.

DESCRIPTION OF EMBODIMENTS

[Soft Magnetic Powder]

In the present invention, a soft magnetic powder containing 20 mass % or more of iron is used as a starting material. Specific examples of the soft magnetic powder containing 20 mass % or more of iron include an Fe—Si alloy, an Fe—Si—Cr alloy, an Fe—Al—Si alloy (Sendust), and an Fe—Ni alloy having a permalloy composition (Ni mass: 30 to 80 mass %). In addition, a small amount (10 mass % or less) of Mo or Co may be added as needed. The alloy to which Mo is added is particularly sometimes called an amorphous powder because the crystal structure becomes amorphous.

Hereinafter, in the present description, unless otherwise specified, the "soft magnetic powder containing 20 mass % or more of iron" is simply referred to as "soft magnetic powder". In the present invention, the magnetic properties of the soft magnetic powder are not particularly specified, but a powder having a low coercive force (Hc) and a high saturation magnetization (σs) is preferable. The lower the Hc, the better, and the Hc is preferably 3.98 kA/m (about 50 (Oe)) or less. If the Hc exceeds 3.98 kA/m, the energy loss when reversing the magnetic field becomes large, which is unsuitable for a magnetic core.

Further, the higher the as, the better, and the σs is preferably 100 $Am^2/kg$ (100 emu/g) or more. If the saturation magnetization is less than 100 $Am^2/kg$, a large amount of a magnetic powder is required and the size of a magnetic core inevitably increases, which is not preferable.

In the present invention, the average particle diameter of the primary particles of the soft magnetic powder is also not particularly specified, but those having an average particle diameter of 0.1 μm or more and 10.0 μm or less can be used. Further, as a known technique, conventionally, there is one including primary particles having an average particle diameter exceeding 0.80 μm and 5.0 μm or less, and a soft magnetic powder including primary particles having an any average particle diameter in this range can be used depending on the purpose.

[Silicon Oxide Coating]

In the present invention, the surface of the soft magnetic powder is coated with insulating silicon oxide by a wet coating method using a silicon alkoxide. The coating method using a silicon alkoxide is a method generally called a sol-gel method, and is excellent in mass productivity as compared with the above-mentioned dry method.

When the silicon alkoxide is hydrolyzed, some or all of the alkoxy groups are substituted with a hydroxyl group (OH group) to form a silanol derivative. In the present invention, the surface of the soft magnetic powder is coated with the silanol derivative, but the coated silanol derivative has a polysiloxane structure by condensation or polymerization when heated, and is converted to silica ($SiO_2$) when the polysiloxane structure is further heated. In the present invention, the silanol derivative coating with some remaining alkoxy groups, which is an organic substance, to the silica coating are collectively referred to as a silicon oxide coating.

As the silicon alkoxide, for example, trimethoxysilane, tetramethoxysilane, triethoxysilane, tetraethoxysilane, tripropoxysilane, tetrapropoxysilane, tributoxysilane, or the like can be used, but it is preferable to use tetraethoxysilane because the wettability to soft magnetic particles is good, and a uniform coating layer can be formed.

[Film Thickness and Coverage Ratio]

The average film thickness of the silicon oxide coating layer is preferably 1 nm or more and 30 nm or less, and more preferably 1 nm or more and 25 nm or less. If the film thickness is less than 1 nm, many defects are present in the coating layer, and it becomes difficult to ensure the insulation property. On the other hand, if the film thickness exceeds 30 nm, the insulation property is improved, but it is not preferable because the powder compaction density of the soft magnetic powder decreases and the magnetic properties deteriorate. The average film thickness of the silicon oxide coating layer is measured by a dissolution method, and the details of the measurement method will be described later. Further, when the measurement is difficult by a dissolution method, the average film thickness can be determined by transmission electron microscopic (TEM) observation or scanning electron microscopic (SEM) observation of the cross section of the silicon oxide coating layer. In this case, a TEM photograph or an SEM photograph of the cross section is captured, and the average film thickness can be determined from an average at 50 sites of measurement points of an arbitrary particle. The film thickness determined by this method is also the same as that obtained by the dissolution method.

The coverage ratio R (%) of the silicon oxide coating layer determined by XPS measurement using the following formula (1) is preferably 70% or more.

$$R=Si\times100/(Si+M) \qquad (1)$$

Here, Si is a molar fraction of Si obtained by X-ray photoelectron spectroscopy (XPS) measurement for the silicon oxide-coated soft magnetic powder, and M is the sum of molar fractions obtained by XPS measurement for metal elements and non-metal elements excluding oxygen among the elements constituting the soft magnetic powder. The M measured by XPS includes, for example, Fe, Ni, Cr, Co, Mo, and Al.

The physical meaning of the coverage ratio R is as follows.

The XPS is a surface analysis in which a solid surface is irradiated with a soft X-ray as an excitation source and a photoelectron emitted from the solid surface is spectroscopically analyzed. In the XPS, the incident X-ray penetrates from the solid surface to a considerable depth (about 1 to 10 μm), but the escape depth of the excited photoelectron is several nanometers or less, which is an extremely small value. This is because the excited photoelectron has an intrinsic mean free path λ that depends on its kinetic energy, and such a value is as small as 0.1 to several nanometers. In the case of the present invention, when there is a defect in the silicon oxide coating layer, a photoelectron derived from a constituent component of the soft magnetic powder exposed in a defective portion is detected. In addition, even when there is no defect in the silicon oxide coating layer, if there is a portion where the average film thickness of the silicon oxide coating layer is thinner than the escape depth of a photoelectron derived from a constituent component of the soft magnetic powder, the photoelectron derived from the constituent component of the soft magnetic powder is likewise detected. Therefore, the coverage ratio R serves as an index that comprehensively represents the average film thickness of the silicon oxide coating layer and the area ratio of the defective portion.

In the case of an Fe—Ni powder used in the below-mentioned Examples, R=Si×100/(Si+Fe+Ni), the film thickness of the silicon oxide coating layer is thicker than the escape depth of photoelectrons of Fe and Ni, and in the case where there is no defect in the silicon oxide coating layer, Fe+Ni=0 and the coverage ratio R is 100%.

When Si is contained as a constituent component of the soft magnetic powder as in the case of an Fe—Si powder or an Fe—Si—Cr powder, the coverage ratio can be determined through calculation by subtracting the molar fraction of Si constituting the soft magnetic powder from the molar fraction of Si in the denominator and numerator of the formula (1).

Here, the molar fraction of Si constituting the soft magnetic powder can be determined by etching the silicon oxide coating layer of the silicon oxide-coated soft magnetic powder using an appropriate method and measuring XPS.

As the etching method, the silicon oxide-coated soft magnetic powder is etched to about 100 nm in teams of $SiO_2$ with an ion sputtering device attached to XPS, or the silicon oxide film can be completely etched by immersing the silicon oxide-coated soft magnetic powder in a 10 mass % aqueous solution of caustic soda under the condition of 80° C. for 20 minutes.

[Volume-Based Cumulative 50% Particle Diameter]

In the case of the present invention, the volume-based cumulative 50% particle diameter D50 of the silicon oxide-coated soft magnetic powder is controlled by a value determined by two measuring methods: a dry method and a wet method. The details of the measurement methods will be described below.

In the case of the dry method, a volume-based cumulative 50% particle diameter measured by a laser diffraction particle size distribution analysis in a state where the silicon oxide-coated soft magnetic powder is dispersed in a gas under the condition of 0.5 MPa is represented by D50 (HE). The volume-based cumulative 50% particle diameter D50 (HE) determined by the dry method is measured in a state where a strong dispersion force is applied so as to eliminate aggregation of the silicon oxide-coated soft magnetic powder to a considerable extent, and therefore becomes a value that approximately reflects the primary particle diameter or the particle diameter of a secondary particle with a low degree of aggregation. In the present invention, the volume-based cumulative 50% particle diameter D50 (HE) obtained by a laser diffraction particle size distribution analysis is preferably 0.1 μm or more and 10.0 μm or less. If the D50 (HE) is less than 0.1 μm, the aggregation force is strong, and the compressibility decreases to decrease the volume ratio of the soft magnetic particles, which is not preferable. Further, if the D50 (HE) exceeds 10.0 μm, the eddy current in the particles increases and the magnetic permeability at a high frequency decreases, which is not preferable.

In the case of the wet method, a volume-based cumulative 50% particle diameter measured by a laser diffraction/scattering particle size distribution analysis in a state where the silicon oxide-coated soft magnetic powder is dispersed in pure water is represented by D50 (MT). In this case, a state where the silicon oxide-coated soft magnetic powder is aggregated during the measurement is not broken up, and therefore, D50 (HE)/D50 (MT) serves as an index showing the aggregability of the silicon oxide-coated soft magnetic powder. In the present invention, the D50 (HE)/D50 (MT) is preferably 0.7 or more. It is more preferably 0.8 or more. If the D50 (HE)/D50 (MT) is less than 0.7, when a green compact is formed, the filling property deteriorates, which is not preferable. In the present invention, the upper limit of the D50 (HE)/D50 (MT) is not particularly specified, however, in the case of the silicon oxide-coated soft magnetic powder having low aggregability, the value of D50 (MT) becomes smaller than the value of D50 (HE), and the D50 (HE)/D50 (MT) becomes about 1.1 in some cases. The D50 (HE)/D50 (MT) is more preferably 1.05 or less, and further more preferably 1.0 or less.

[Tap Density]

The tap density of the silicon oxide-coated soft magnetic powder of the present invention is 3.0 ($g/cm^3$) or more and 5.0 ($g/cm^3$) or less from the viewpoint that a high filling factor can be obtained when molding a green compact. It is more preferably 3.3 ($g/cm^3$) or more and 5.0 ($g/cm^3$) or less. Further, when the silicon oxide-coated soft magnetic powder is used as a material of a powder compact magnetic core, in order to form a powder compact magnetic core in which the filling property of the silicon oxide-coated soft magnetic powder is increased, the ratio of the tap density to the D50 (MT) representing the volume-based cumulative 50% particle diameter measured by a laser diffraction/scattering particle size distribution analysis in a state where the silicon oxide-coated soft magnetic powder is dispersed in pure water (tap density/D50 (MT)) is preferably 0.5 ($g/cm^3$)/(μm) or more and 5.0 ($g/cm^3$)/(μm) or less, and more preferably 0.6 ($g/cm^3$)/(μm) or more and 3.0 ($g/cm^3$)/(μm) or less.

[Mixed Solvent and Slurry Production Step]

In the manufacturing method of the present invention, the surface of the soft magnetic powder is coated with silicon oxide by a sol-gel method in a state where the soft magnetic powder is dispersed in a mixed solvent of water and an organic solvent by stirring through a known mechanical means, but prior to the coating, a slurry production step in which a slurry containing the soft magnetic powder in the mixed solvent is held is provided. An extremely thin oxide of Fe, which is the main component of the soft magnetic powder, is present on the surface of the soft magnetic powder, but in the slurry production step, the Fe oxide is hydrated with water contained in the mixed solvent. The surface of the hydrated Fe oxide is a kind of solid acid and shows a behavior similar to a weak acid as a Bronsted acid, and therefore, when a silicon alkoxide is added to the slurry containing the soft magnetic powder in the mixed solvent in the subsequent step, the reactivity of a silanol derivative which is a hydrolysate of the silicon alkoxide with the surface of the soft magnetic powder is improved.

The content of water in the mixed solvent is preferably 1 mass % or more and 40 mass % or less. It is more preferably 5 mass % or more and 30 mass % or less, and further more preferably 10 mass % or more and 20 mass % or less. If the content of water is less than 1 mass %, the above-mentioned action of hydrating Fe oxide is insufficient. If the content of water exceeds 40 mass %, the hydrolysis rate of the silicon alkoxide increases, and a uniform silicon oxide coating layer cannot be obtained, and therefore, such contents are not preferable.

As the organic solvent used in the mixed solvent, it is preferable to use an aliphatic alcohol having affinity for water such as methanol, ethanol, 1-propanol, 2-propanol, butanol, pentanol, or hexanol. However, if the solubility parameter of the organic solvent is too close to that of water, the reactivity of water in the mixed solvent decreases, and therefore, it is more preferable to use 1-propanol, 2-propanol (isopropyl alcohol), butanol, pentanol, or hexanol.

In the present invention, the reaction temperature in the slurry production step is not particularly specified, but is preferably set to 20° C. or higher and 70° C. or lower. If the reaction temperature is lower than 20° C., the hydration reaction rate of Fe oxide decreases, which is not preferable. Further, if the reaction temperature exceeds 70° C., the hydrolysis reaction rate of the added silicon alkoxide increases in an alkoxide addition step which is the subsequent step, and the uniformity of the silicon oxide coating layer deteriorates, which is not preferable. In the present invention, the holding time in the slurry production step is also not particularly specified, but the conditions are appropriately selected in such a manner that the holding time is 1 minute or more and 30 minutes or less so that the hydration reaction of Fe oxide occurs uniformly.

[Alkoxide Addition Step]

While stirring the slurry in which the soft magnetic powder is dispersed in the mixed solvent obtained in the above-mentioned slurry production step by a known mechanical means, the silicon alkoxide is added thereto, and thereafter, the slurry is held for a given time in the state. As the silicon alkoxide, as described above, trimethoxysilane, tetramethoxysilane, triethoxysilane, tetraethoxysilane, tripropoxysilane, tetrapropoxysilane, tributoxysilane, or the like can be used.

The silicon alkoxide added in this step is hydrolyzed by the action of water contained in the mixed solvent and converted to a silanol derivative. The produced silanol derivative forms a reaction layer of the silanol derivative on the surface of the soft magnetic powder by condensation, chemical adsorption, or the like. Since no hydrolysis catalyst is added in this step, the hydrolysis of the silicon alkoxide occurs slowly, and therefore, it is considered that the reaction layer of the silanol derivative is uniformly formed.

Since nearly the entire amount of the silicon alkoxide added in this step is used for forming the silicon oxide coating layer, the addition amount thereof is set so that the average film thickness of the silicon oxide coating layer becomes 1 nm or more and 30 nm. Specifically, the addition amount of the silicon alkoxide is determined by the following method.

When the mass of the soft magnetic powder contained in the slurry is represented by Gp (g), the BET specific surface area of the soft magnetic powder before coating is represented by S ($m^2/g$), and the target film thickness of the silicon oxide coating layer is represented by t (nm), the total volume of the silicon oxide coating layer is expressed as follows: $V=Gp\times S\times t$ ($10^{-5}\ m^3$), and when the density of the silicon oxide coating layer is set as follows: d=2.65 ($g/cm^3=10^6\ g/cm^3$), the mass of the silicon oxide coating layer is expressed as follows: $Gc=0.1\ V\times d$ (g). Therefore, the number of moles of Si contained in the silicon oxide coating layer is determined as a value obtained by dividing Gc by 60.08 which is the molecular weight of $SiO_2$. In the manufacturing method of the present invention, the silicon alkoxide whose number of moles corresponds to the above target film thickness t (nm) is added into the slurry in which the soft magnetic powder is dispersed in the mixed solvent.

It has been confirmed that the average film thickness of the silicon oxide coating layer determined by cutting the silicon oxide-coated soft magnetic powder using a focused ion beam (FIB) processing device and performing measurement through transmission electron microscopic (TEM) observation accurately matches with the film thickness determined by the below-mentioned dissolution method assuming that the density of the silicon oxide coating layer to be as follows: d=2.65 ($g/cm^3$).

In the present invention, the reaction temperature in the alkoxide addition step is not particularly specified, but is preferably 20° C. or higher and 70° C. or lower. If the reaction temperature is lower than 20° C., the reaction rate between the surface of the soft magnetic powder and the silanol derivative decreases, which is not preferable. Further, if the reaction temperature exceeds 70° C., the hydrolysis reaction rate of the added silicon alkoxide increases, and the uniformity of the silicon oxide coating layer deteriorates, which is not preferable. In the present invention, the reaction time in the alkoxide addition step is also not particularly specified, but the conditions are appropriately selected in such a manner that the reaction time is 10 minutes or less so that the reaction between the surface of the soft magnetic powder and the silanol derivative occurs uniformly.

[Hydrolysis Catalyst Addition Step]

In the manufacturing method of the present invention, after the reaction layer of the silanol derivative is formed on the surface of the soft magnetic powder in the above-mentioned alkoxide addition step, while stirring the slurry in which the soft magnetic powder is dispersed in the mixed solvent by a known mechanical means, a hydrolysis catalyst for the silicon alkoxide is added thereto. In this step, by the addition of the hydrolysis catalyst, the hydrolysis reaction of the silicon alkoxide is promoted and the film formation rate of the silicon oxide coating layer is increased. After this step, the method is the same as the film formation method by a conventional sol-gel method.

As the hydrolysis catalyst, an alkaline catalyst is used. When an acid catalyst is used, Fe which is the main component of the soft magnetic powder is dissolved, and therefore, an acid catalyst is not preferable. As the alkaline catalyst, it is preferable to use ammonia water because impurities are less likely to remain in the silicon oxide coating layer and it is easily available.

In the present invention, the reaction temperature in the hydrolysis catalyst addition step is not particularly specified, and may be the same as the reaction temperature in the alkoxide addition step which is the previous step. Further, in the present invention, the reaction time in the hydrolysis catalyst addition step is also not particularly specified, but a long reaction time is economically disadvantageous, and therefore, the conditions are appropriately selected in such a manner that the reaction time is 5 minutes or more and 120 minutes or less.

[Dispersion Treatment]

A feature of the present invention is that the slurry is subjected to a dispersion treatment in the above-mentioned hydrolysis catalyst addition step. The dispersion treatment may be performed in a dispersion treatment device by taking out a part of the slurry to which the hydrolysis catalyst is added outside the reaction system, or may be performed by installing a dispersion treatment means in the reaction system. When the dispersion treatment is performed, the aggregation of the silicon oxide-coated soft magnetic powder can be broken up. The slurry subjected to the dispersion treatment is returned to the reaction system again and the film formation reaction of the silicon oxide coating layer is continued.

Since the aggregation of the particles occurs at any time during the hydrolysis of the silicon alkoxide, the dispersion treatment may be performed between the timing of start of the hydrolysis reaction, that is, the time point when the hydrolysis catalyst is added and stirring is started and the timing of completion of the hydrolysis reaction. The time point when the hydrolysis reaction is completed may be measured in advance by observing the precipitation state of the hydrolysate of the silicon alkoxide using a solution obtained by filtering out the soft magnetic powder. Note that in the dispersion treatment, either a continuous treatment or an intermittent treatment may be used. By performing the dispersion treatment during the hydrolysis reaction, the surfaces of the primary particles resulting from disintegration by dispersion are coated with silicon oxide at any time, so that the silicon oxide-coated soft magnetic powder in which the coating with the silicon alkoxide is uniform and the surface of the original powder is less exposed can be manufactured. If dispersion is performed after completion of the hydrolysis, the surface of the original powder is exposed by disintegration to deteriorate the coverage ratio, resulting in deterioration of the weather resistance.

In the case of a stirrer using a general stirring blade, when the peripheral speed of the stirring blade exceeds about 30 m/s, a phenomenon called "idle rotation" which cannot give the stirring energy to the treated liquid occurs, and therefore, there was a limit to acceleration which is indispensable for dispersion. For this reason, as a method for giving energy that enables high dispersion, a wet disperser using a medium, an ultrasonic homogenizer that achieves dispersion by causing cavitation accompanied by a shock wave using an ultrasonic wave, a high-pressure homogenizer that can crush aggregated particles to form a homogeneous dispersion state by allowing a fluid to pass through a narrow path in a high-pressure state to cause shear, turbulence, cavitation, or the like in the fluid, a thin-film spin system (FILMIX) that achieves dispersion with a thin film formed by a strong centrifugal force, a high-speed stirring mixer that rotates an inner wall forming a gap in the direction opposite to that of a stirring blade as shown in JP-A-4-114725, and the like are known. Among them, it is preferable to use a high-pressure homogenizer or a high-speed stirring mixer as a method for strongly dispersing the secondary aggregated particles without damaging the core particles to be coated.

The dispersion conditions using the high-pressure homogenizer may be appropriately adjusted according to the particle diameter/particle size distribution/composition of the core, the silicon oxide coating film thickness, and the amount of the reaction liquid. It is preferably 1 MPa (10 bar) or more and 50 MPa (500 bar) or less, and more preferably 2 MPa (20 bar) or more and 30 MPa (300 bar) or less. If the pressure is low, dispersion does not proceed, and if the pressure is too high, damage to the silicon oxide coating film and the core particles is confirmed, and therefore, the conditions may be adjusted while confirming the dispersion state, the shapes of the core particles, and the state of the coating film.

The dispersion conditions using the high-speed stirring mixer may also be appropriately adjusted according to the particle diameter/particle size distribution/composition of the core, the silicon oxide coating film thickness, and the amount of the reaction liquid as described above. Preferably, the sum of the peripheral speed of the stirring blade and the peripheral speed of the inner wall forming a gap in the opposite direction is preferably 30 m/s or more and 100 m/s or less, and preferably 40 m/s or more and 80 m/s or less. If the total peripheral speed is slow, dispersion does not proceed, and if the total peripheral speed is too fast, damage to the silicon oxide coating film and the core particles is confirmed, and therefore, the conditions may be adjusted while confirming the dispersion state, the shapes of the core particles, and the state of the coating film. Further, when the rotation of either of the stirring blade and the inner wall forming a gap in the opposite direction is faster, "idle rotation" occurs as described above, and therefore, the peripheral speed ratio of the stirring blade and the inner wall (the peripheral speed of the stirring blade/the peripheral speed of the inner wall) is preferably set to 0.6 or more and 1.8 or less.

[Solid-Liquid Separation and Drying]

The silicon oxide-coated soft magnetic powder is recovered from the slurry containing the silicon oxide-coated soft magnetic powder obtained by a series of steps described up to this point using a known solid-liquid separation means. As the solid-liquid separation means, a known solid-liquid separation means such as filtration, centrifugation, or decantation can be used. In the solid-liquid separation, an aggregation agent may be added to perform the solid-liquid separation.

The recovered silicon-coated soft magnetic powder is dried at a temperature of 80° C. or higher in an air atmosphere. When drying is performed at 80° C. or higher, the water content of the silicon oxide-coated soft magnetic powder can be reduced to 0.25 mass % or less. The drying temperature is preferably 85° C. or higher, and more preferably 90° C. or higher. Further, the drying temperature is preferably 400° C. or lower, and more preferably 150° C. or lower so that the silicon oxide coating is not peeled off. If the oxidation of the soft magnetic powder is desired to be suppressed, drying is performed in an inert gas atmosphere or a vacuum atmosphere.

[Composition Analysis of Soft Magnetic Powder]

[Fe Content]

The Fe content was measured as follows using a titrimetric method in accordance with JIS M 8263 (Chromium ores—Method for determination of iron content).

First, sulfuric acid and hydrochloric acid were added to 0.1 g of a sample (alloy powder) to decompose the sample by heating, and the sample was heated until white smoke of sulfuric acid was generated. After the sample was allowed to cool, water and hydrochloric acid were added thereto, followed by heating to dissolve soluble salts. Then, warm water was added to the obtained sample solution to adjust the liquid amount to about 120 to 130 mL, and after the liquid temperature was adjusted to about 90 to 95° C., a few drops of an indigocarmine solution were added thereto, and a titanium(III) chloride solution was added thereto until the color of the sample solution was changed from yellow green to blue, and then colorless and transparent. Subsequently, a potassium dichromate solution was added thereto until the sample solution kept a blue state for 5 seconds. The iron(II) in this sample solution was titrated with a potassium dichromate standard solution using an automatic titrator to determine the amount of Fe.

[Si Content]

The Si content was measured by a gravimetric method. Hydrochloric acid and perchloric acid are added to a sample to decompose the sample by heating, and the sample is heated until white smoke of perchloric acid is generated. Heating is continued to dryness. After the sample is allowed to cool, water and hydrochloric acid are added thereto, followed by heating to dissolve soluble salts. The insoluble residue is filtered using a filter paper, and the residue is transferred to a crucible together with the filter paper, and dried and asked. The resultant is allowed to cool and then weighed together with the crucible. A small amount of sulfuric acid and hydrofluoric acid are added thereto, followed by heating to dryness, and then heating strongly. The resultant is allowed to cool and then weighed together with the crucible. The second weighing value is subtracted from the first weighing value to calculate the weight difference as $SiO_2$ and determine the Si concentration.

[Cr Content]

The Cr content was calculated from an analysis result using an inductively coupled plasma (ICP) optical emission spectroscope (SPS3520V manufactured by Hitachi High-Tech Science Corporation) after the sample was dissolved.

[Ni Content]

The Ni content was calculated from an analysis result using an inductively coupled plasma (ICP) optical emission spectroscope (SPS3520V manufactured by Hitachi High-Tech Science Corporation) after the sample was dissolved.

[Calculation of Average Film Thickness of Silicon Oxide Coating Layer]

When the Si content of the silicon oxide-coated soft magnetic powder measured by the above-mentioned method is represented by A (mass %), the mass ratio of the silicon oxide coating layer represented by B (mass %) is calculated by the following formula from the atomic weight of Si and the molecular weight of $SiO_2$.

$$B=A\times\text{molecular weight of }SiO_2/\text{atomic weight of Si}=A\times 60.08/28.09$$

When B is used, the average film thickness t (nm) of the silicon oxide coating layer is represented by the following formula. Note that 10 in the following formula is a conversion factor.

$$t(\text{nm})=10\times B/(d\times S)$$

Here,

S: BET specific surface area ($m^2/g$) before coating of soft magnetic powder d: Density of silicon oxide coating layer ($g/cm^3$)

When Si is contained as a constituent component of the soft magnetic powder as in the case of an Fe—Si powder or an Fe—Si—Cr powder, after the Si content of the particles before coating is determined by the above-mentioned measurement method, the average film thickness of the silicon oxide coating layer is calculated using a value obtained by subtracting Si contained in the soft magnetic powder from the above A (=Si in the silicon oxide coating film).

[Measurement of BET Specific Surface Area]

The BET specific surface area was determined by a BET one-point method using 4 Sorb US manufactured by Yuasa Ionics Co., Ltd.

[SEM Observation]

The SEM observation was performed using S-4700 manufactured by Hitachi High-Technologies Corporation at an acceleration voltage of 3 kV and a magnification of 1000 times and 5000 times.

[Measurement of Volume-Based Cumulative 50% Particle Diameter D50]

(1) Measurement of D50 (HE)

The particle size distribution of the soft magnetic powder before the coating treatment and after the silicon oxide coating treatment was measured using a laser diffraction particle size distribution device (Helos particle size distribution analyzer (HELOS & RODOS (airflow type dispersion module)) manufactured by Sympatec GmbH) at a dispersion pressure of 0.5 MPa (5 bar) and a pulling pressure of $5\times10^{-3}$ Pa (50 mbar) using nitrogen gas. The volume-based cumulative 10% particle diameter (D10), cumulative 50% particle diameter (D50), and cumulative 90% particle diameter (D90) were determined using the same device, and the cumulative 50% particle diameter was represented by D50 (HE).

(2) Measurement of D50 (MT)

The particle size distribution of the soft magnetic powder before the coating treatment and after the silicon oxide coating treatment was measured using a laser diffraction scattering particle size distribution analyzer (Microtrac MT3000 II manufactured by MicrotracBEL Corp.) by adding a dry powder to water of a dispersion solvent circulating in the device. The volume-based cumulative 10% particle diameter (D10), cumulative 50% particle diameter (D50), and cumulative 90% particle diameter (D90) were determined using the same device, and the cumulative 50% particle diameter of the soft magnetic powder after the silicon oxide coating treatment was represented by D50 (MT), and the value was defined as the average particle diameter.

As the device setting items, a flow rate, particle permeability, and measurement time were set as follows.

Flow rate: 90%

Particle permeability: Reflection

Measurement time: 30 seconds

[Measurement of Tap Density]

In the measurement of the tap density (TAP), the method described in JP-A-2007-263860 was used. Specifically, the method is as follows.

A bottomed cylindrical die with an inner diameter of 6 mm and a height of 11.9 mm was filled with the soft magnetic powder before the coating treatment or the silicon oxide-coated soft magnetic powder after the silicon oxide coating treatment up to 80% of its volume to form a soft magnetic powder layer or a silicon oxide-coated soft magnetic powder layer, and a pressure of 0.160 $N/m^2$ is uniformly applied to the upper surface of the soft magnetic powder layer or the silicon oxide-coated soft magnetic powder layer so as to compress the layer until the soft magnetic powder before the coating treatment or after the silicon oxide coating treatment was no longer densely packed. Thereafter, the height of the soft magnetic powder layer or the silicon oxide-coated soft magnetic powder layer was measured, and from the measured value of the height of the soft magnetic powder layer or the silicon oxide-coated soft magnetic powder layer and the weight of the filled soft magnetic powder before the coating treatment or after the silicon oxide coating treatment, the density of the soft magnetic powder before the coating treatment or after the silicon oxide coating treatment was determined, and the density was defined as the tap density.

[XPS Measurement]

In the XPS Measurement, PHI 5800 ESCA SYSTEM manufactured by ULVAC-PHI, Inc. was used. The analysis area was set to a diameter of 800 μm, as the X-ray source, an Al tube was used, the output of the X-ray source was set to 150 W, and the analysis angle was set to 45°. The molar fractions of Si, Fe, and Ni were calculated by a computer built into the device using a 2p3/2 orbital spectrum for Si, a 2p3/2 orbital spectrum for Fe, and a 2p3/2 orbital spectrum for Ni among the obtained photoelectron spectra and the relative sensitivity factor of the photoelectron spectrum of each molecule. When Co and Cr were analyzed, 2p orbitals were used as the spectral species. In a background treatment, the Shirley method was used. Incidentally, the measurement of the photoelectron spectrum on the outermost surface of the particle was performed without sputter etching.

Each of these values was substituted into the place of the corresponding element symbol in the above formula (1) and the coverage ratio R (%) was calculated.

[Measurement of Volume Resistivity]

In the measurement of the volume resistivity of the silicon oxide-coated soft magnetic powder, a powder resistance measurement unit (MCP-PD51) manufactured by Mitsubishi Chemical Analytech Co., Ltd., a high resistance resistivity meter Hiresta-UP (MCP-HT450) manufactured by Mitsubishi Chemical Analytech Co., Ltd., and a high resistance powder measurement system software manufactured by Mitsubishi Chemical Analytech Co., Ltd. were used, and a load of 20 kN was applied to a powder sample with a mass of 4 g in an insulator cylinder with an inner diameter of 20 mm to produce a green compact sample in a disk shape with a diameter of 20 mm, and the volume resistivity was measured by a double ring electrode method in a state where a load of 20 kN was applied to the green compact sample.

[Weather Resistance]

The weather resistance of the silicon oxide-coated soft magnetic powder was evaluated by the following procedure.

The silicon oxide-coated soft magnetic powder was left in an air atmosphere at 150° C. for 200 hours, and then the volume resistivity was measured in the same manner as described above and used as an index of weather resistance. One in which the value of the volume resistivity at this time was $1.0\times10^7$ (Ω·cm) or more was evaluated as "A".

EXAMPLES

Example 1

FIG. 1 shows a schematic view of a reactor used in Examples of the present invention. Further, FIG. 2 shows a flowchart of a process in Example 1.

In a 1000 mL reaction vessel, 90 g of pure water and 516 g of isopropyl alcohol (IPA) were placed at room temperature and mixed using a stirring blade to prepare a mixed solvent, and thereafter, 322 g of an FeSiCr alloy powder (Fe: 89.6 mass %, Si: 6.8 mass, Cr: 2.4 mass %, BET specific surface area: 0.46 $m^2/g$, D50 (HE): 3.16 μm, D50 (MT): 3.17 μm, TAP density: 4.0 $g/cm^3$) was added to the mixed solvent as a soft magnetic powder, whereby a slurry in which the soft magnetic powder was dispersed was obtained. In FIGS. 3 and 4, an SEM photograph of the FeSiCr alloy powder is shown. Here, the lengths indicated by 11 white vertical lines in the lower right portions of FIGS. 3 and 4 are 10 μm and 50 μm, respectively.

Thereafter, the temperature of the slurry was raised from room temperature to 40° C. while stirring the slurry at a stirring rate of 600 rpm. During this period, the stirring time of the slurry is 15 minutes.

To the slurry in which the soft magnetic powder was dispersed in the mixed solvent under stirring, 7.2 g of tetraethoxysilane (TEOS: Wako Pure Chemical Industries, Ltd. special grade reagent) taken out into a small-volume beaker was added all at once. TEOS adhering to the vessel wall of the small-volume beaker was washed off with 20 g of IPA and added to the reaction vessel. After the addition of TEOS, stirring was continued for 5 minutes to allow the hydrolysate of TEOS and the surface of the soft magnetic powder to react with each other.

Subsequently, to the slurry held for 5 minutes after the addition of TEOS, 28 mass % ammonia water was continuously added at an addition rate of 0.62 g/min for 10 minutes. Ten minutes after the start of addition of ammonia water, a liquid feeding pump was operated to feed the liquid to a high-pressure homogenizer (LAB 1000 manufactured by SMT Co., Ltd.) at a liquid feed rate of 450 g/min. At the same time as the liquid was fed, the high-pressure homogenizer was set at a pressure of 1 MPa (10 bar), and the dispersion treatment was performed. The reaction liquid after completion of the dispersion treatment was configured to return to the 1000 mL reaction vessel. This series of treatments (reaction liquid extraction→dispersion treatment→return circulation operation) was repeated for 5 minutes, during which the ammonia water was continuously added at 0.62 g/min.

In this Example, the set of the reaction of the soft magnetic powder with the hydrolysate of TEOS for 10 minutes without dispersion treatment under the stirring treatment and thereafter the dispersion treatment for 5 minutes described above was repeated 6 times. Therefore, the continuous addition of ammonia water ends up continuing for 90 minutes.

After the continuous addition of ammonia water was completed, the mixture was stirred for 15 minutes. Thereafter, the liquid feeding pump was operated to feed the liquid to the high-pressure homogenizer at a liquid feed rate of 450 g/min. At the same time as the liquid was fed, the high-pressure homogenizer was set to a pressure of 10 bar, and the dispersion treatment was performed for 5 minutes. This treatment was performed for 60 minutes (3 sets of stirring for 15 minutes→dispersion for 5 minutes (60 minutes in total)).

While performing the above treatment, a silicon oxide coating layer was formed on the surface of the soft magnetic powder (coating reaction).

Thereafter, the slurry was filtered off using a pressure filtration device and dried in the air at 100° C. for 10 hours, whereby a silicon oxide-coated soft magnetic powder was obtained.

The composition analysis of the obtained silicon oxide-coated soft magnetic powder and XPS measurement were performed, and the film thickness t (nm) and the coverage ratio R (%) of the silicon oxide coating layer were calculated. The film thickness t was 5 nm and the coverage ratio R was 81%. The results are shown in Table 1-1. In Table 1-1, the measurement results of the particle size distribution of the obtained silicon oxide-coated soft magnetic powder, and the measurement results of the TAP density and the volume resistivity of a green compact are also shown (the same applies to Table 1-2).

Examples 2 and 3

Silicon oxide-coated soft magnetic powders were obtained by the same procedure as in Example 1 except that the amount of TEOS to be added to the slurry was changed to 14.3 g in Example 2 and 28.6 g in Example 3 and the dispersion pressure of the high-pressure homogenizer was changed to 2 MPa (20 bar) in Example 2 and 4 MPa (40 bar) in Example 3. The measurement results of the film thickness of the silicon oxide coating layer, the coverage ratio, and the water content calculated for each of the obtained silicon oxide-coated soft magnetic powders, and the particle size distribution of each of the silicon oxide-coated soft magnetic powders, the TAP density, and the volume resistivity of a green compact are also shown in Table 1-1.

In addition, in FIGS. 5 and 6, the SEM observation result of the silicon oxide-coated soft magnetic powder obtained in Example 2 is shown. Here, the lengths indicated by 11 white vertical lines in the lower right portions of FIGS. 5 and 6 are 10 μm and 50 μm, respectively.

When the addition amount of TEOS is increased, the film thickness of the silicon oxide coating layer increases and also the coverage ratio increases. The volume resistivity of the green compact increases as the film thickness increases, but the TAP density decreases slightly. The silicon oxide-coated soft magnetic powders obtained in the Examples of the present invention are characterized in that as compared with those in the below-mentioned Comparative Examples, the decrease in the TAP density and the increase in the particle diameter (D50 (MT)) with respect to the soft magnetic powder before coating (original powder) are significantly suppressed.

Comparative Examples 1 to 3

In Comparative Example 1, the soft magnetic powder (original powder) was subjected to the silicon oxide coating treatment under the same conditions (amount of material, reaction time, temperature) as in Example 1 except that the dispersion treatment with a high-pressure homogenizer was not performed.

In Comparative Example 2, the soft magnetic powder (original powder) was subjected to the silicon oxide coating treatment under the same conditions (amount of material, reaction time, temperature) as in Example 2 except that the dispersion treatment with a high-pressure homogenizer was not performed.

In Comparative Example 3, the soft magnetic powder (original powder) was subjected to the silicon oxide coating treatment under the same conditions (amount of material, reaction time, temperature) as in Example 3 except that the dispersion treatment with a high-pressure homogenizer was not performed.

The properties of the silicon oxide-coated soft magnetic powders obtained in these Comparative Examples are shown in Table 1-1. As can be seen from the table, it can be confirmed that in the Comparative Examples without dispersion treatment, the decrease in the TAP density and the increase in the particle diameter (D50 (MT)) are remarkable as compared with the Examples.

In FIGS. 7 and 8, the SEM observation result of the silicon oxide-coated soft magnetic powder obtained in Comparative Example 2 is shown. Here, the lengths indicated by 11 white vertical lines in the lower right portions of FIGS. 7 and 8 are 10 μm and 50 μm, respectively. As can be seen from the drawings, it can be confirmed that in the Comparative Examples without dispersion treatment, the primary particles are aggregated into secondary particles.

Comparative Example 4

In Comparative Example 4, after a silicon oxide-coated soft magnetic powder was produced under the same conditions as in Comparative Example 2, a dry dispersion treatment was performed using a small pulverizer ((Sample Mill) (KS-M10, manufactured by Kyoritsu Riko Co., Ltd.)). As the dispersion treatment conditions, 200 g of the silicon oxide-coated soft magnetic powder was placed in the small pulverizer, and the operation of the treatment at 18,000 rpm (treatment rate Max) for 30 seconds was repeated three times. The properties of the thus obtained silicon oxide-coated soft magnetic powder are shown in Table 1-1. As can be seen from Table 1-1, it was confirmed that the TAP density and the particle diameter (D50 (MT)) were in a state close to those of the original powder (a state close to those of Example 2), but it can also be confirmed that the coverage ratio by XPS significantly decreases. This is considered to be because the silicon oxide coating layer was peeled off or aggregation was broken up by a physical impact, so that the soft magnetic powder serving as a core was partially exposed.

Example 4

In a 5000 mL reaction vessel, 456 g of pure water and 2700 g of isopropyl alcohol (IPA) were placed at room temperature and mixed using a stirring blade to prepare a mixed solvent, and thereafter, 1650 g of the same FeSiCr alloy powder as used in Example 1 was added to the mixed solvent as a soft magnetic powder, whereby a slurry in which the soft magnetic powder was dispersed was obtained. Thereafter, the temperature of the slurry was raised from room temperature to 40° C. while stirring the slurry at a stirring rate of 300 rpm. During this period, the stirring time of the slurry is 30 minutes.

To the slurry in which the soft magnetic powder was dispersed in the mixed solvent under stirring, 73.4 g of tetraethoxysilane (TEOS: Wako Pure Chemical Industries, Ltd. special grade reagent) taken out into a small-volume beaker was added all at once. TEOS adhering to the vessel wall of the small-volume beaker was washed off with 50 g of IPA and added to the reaction vessel. After the addition of TEOS, stirring was continued for 5 minutes to allow the hydrolysate of TEOS and the surface of the soft magnetic powder to react with each other.

Subsequently, a liquid feeding pump was operated to feed the liquid to a high-speed stirring mixer (CLEARMIX W-MOTION (model CLM-2.2/3.7 W) manufactured by M Technique Co., Ltd.) at a liquid feed rate of 2500 g/min. At the same time as the liquid was fed, the rotation speed of a rotor (R1) as a stirring blade of the high-speed stirring mixer was set to 21,000 rpm (peripheral speed: 38.5 m/s) and the rotation speed of a screen (S0.8-48) as an inner wall that rotates in the direction opposite to that of the stirring blade was set to 19,000 rpm (peripheral speed: 34.8 m/s) so as to adjust the total peripheral speed of the rotor and the screen to 73.3 m/s and the peripheral speed ratio of the stirring blade and the inner wall (the peripheral speed of the stirring blade/the peripheral speed of the inner wall) to 1.1, and the dispersion treatment was performed. The liquid after completion of the dispersion treatment was configured to return to the 5000 mL reaction vessel.

Almost at the same time as the pump was operated, to the slurry held for 5 minutes after the addition of TEOS, 28 mass % ammonia water was continuously added at an addition rate of 3.15 g/min for 90 minutes. After the addition of ammonia was completed, stirring and the dispersion treatment with a high-speed stirring mixer were also performed for 60 minutes in the same manner.

The properties of a silicon oxide-coated soft magnetic powder obtained by performing the same process as in Example 1 thereafter are shown in Table 1-1.

Example 5

In Example 5, a silicon oxide-coated soft magnetic powder was produced under the same conditions as in Example 2 except that an FeSiCr alloy powder (Fe: 91.0 mass %, Si: 3.5 mass, Cr: 4.5 mass %, BET specific surface area: 0.46 $m^2/g$, D50 (HE): 4.65 um, D50 (MT): 4.60 um, TAP density: 3.8 $g/cm^3$) was used and the high-pressure homogenizer during dispersion was set to 3 MPa (30 bar), and the properties of the obtained silicon oxide-coated soft magnetic powder are shown in Table 1-1.

Comparative Example 5

In Comparative Example 5, the soft magnetic powder (original powder) was subjected to the silicon oxide coating treatment under the same conditions (amount of material, reaction time, temperature) as in Example 5 except that the dispersion treatment with a high-pressure homogenizer was not performed. The properties of the obtained silicon oxide-coated soft magnetic powder are shown in Table 1-1.

Example 6

In Example 6, a silicon oxide-coated soft magnetic powder was produced under the same conditions as in Example 1 except that an FeSiCr alloy powder (Fe: 90.5 mass %, Si: 3.5 mass %, Cr: 4.5 mass %, BET specific surface area: 0.77 $m^2/g$, D50 (HE): 1.58 μm, D50 (MT): 1.58 μm, TAP density: 4.1 $g/cm^3$) was used, the amount of TEOS to be added was changed to 24.0 g, and the high-pressure homogenizer during dispersion was set to 10 MPa (100 bar), and the properties of the obtained silicon oxide-coated soft magnetic powder are shown in Table 1-1.

Comparative Example 6

In Comparative Example 6, the silicon oxide coating treatment was performed under the same conditions (amount of material, reaction time, temperature) as in Example 6 except that the dispersion treatment with a high-pressure homogenizer was not performed. The properties of the obtained silicon oxide-coated soft magnetic powder are shown in Table 1-1.

Example 7

In Example 7, a silicon oxide-coated soft magnetic powder was produced under the same conditions as in Example 1 except that an FeSi alloy powder (Fe: 92.8 mass %, Si: 6.2 mass %, BET specific surface area: 0.48 $m^2/g$, D50 (HE): 4.88 μm, D50 (MT): 5.05 μm, TAP density: 3.9 $g/cm^3$) was used, the amount of TEOS to be added was changed to 14.9 g, and the high-pressure homogenizer during dispersion was set to 100 bar (10 MPa), and the properties of the obtained silicon oxide-coated soft magnetic powder are shown in Table 1-1.

Comparative Example 7

In Comparative Example 7, the silicon oxide coating treatment without dispersion treatment with a high-pressure homogenizer was performed under the same conditions (amount of material, reaction time, temperature) as in Example 7. The properties of the obtained silicon oxide-coated soft magnetic powder are shown in Table 1-1.

Examples 8, 9, and 10

In Examples 8, 9, and 10, an FeNi alloy powder (Fe: 49.5 mass %, Ni: 49.5 mass %, BET specific surface area: 0.86 $m^2/g$, D50 (HE): 1.53 μm, D50 (MT): 2.20 μm, TAP density: 4.1 $g/cm^3$) was used. Silicon oxide-coated soft magnetic powders were produced under the same conditions as in Example 1 except that the amount of TEOS to be added was changed to 13.4 g and the high-pressure homogenizer during dispersion was set to 5 MPa (50 bar) in Example 8, the amount of TEOS to be added was changed to 26.8 g and the high-pressure homogenizer during dispersion was set to 10 MPa (100 bar) in Example 9, and the amount of TEOS to be added was changed to 53.6 g and the high-pressure homogenizer during dispersion was set to 20 MPa (200 bar) in Example 10, and the properties of the obtained silicon oxide-coated soft magnetic powders are shown in Table 1-2.

Comparative Examples 8, 9, and 10

In Comparative Example 8, the silicon oxide coating treatment was performed under the same conditions (amount of material, reaction time, temperature) as in Example 8 except that the dispersion treatment with a high-pressure homogenizer was not performed.

In Comparative Example 9, the silicon oxide coating treatment was performed under the same conditions (amount of material, reaction time, temperature) as in Example 9 except that the dispersion treatment with a high-pressure homogenizer was not performed.

In Comparative Example 10, the silicon oxide coating treatment was performed under the same conditions (amount of material, reaction time, temperature) as in Example 10 except that the dispersion treatment with a high-pressure homogenizer was not performed. The properties of the obtained silicon oxide-coated soft magnetic powders are shown in Table 1-2.

Examples 11, 12, and 13

In Examples 11, 12, and 13, a carbonyl Fe powder (BET specific surface area: 0.43 $m^2/g$, D50 (HE): 4.10 um, D50 (MT): 4.11 um, TAP density: 4.2 $g/cm^3$) was used. Silicon oxide-coated soft magnetic powders were produced under the same conditions as in Example 1 except that the amount of TEOS to be added was changed to 6.7 g and the high-pressure homogenizer during dispersion was set to 2 MPa (20 bar) in Example 11, the amount of TEOS to be added was changed to 13.4 g and the high-pressure homogenizer during dispersion was set to 5 MPa (50 bar) in Example 12, and the amount of TEOS to be added was changed to 26.8 g and the high-pressure homogenizer during dispersion was set to 10 MPa (100 bar) in Example 13, and the properties of the obtained silicon oxide-coated soft magnetic powders are shown in Table 1-2.

Comparative Examples 11, 12, and 13

In Comparative Example 11, the silicon oxide coating treatment was performed under the same conditions (amount of material, reaction time, temperature) as in Example 11 except that the dispersion treatment with a high-pressure homogenizer was not performed.

In Comparative Example 12, the silicon oxide coating treatment was performed under the same conditions (amount of material, reaction time, temperature) as in Example 12 except that the dispersion treatment with a high-pressure homogenizer was not performed.

In Comparative Example 13, the silicon oxide coating treatment was performed under the same conditions (amount of material, reaction time, temperature) as in Example 13 except that the dispersion treatment with a high-pressure homogenizer was not performed. The properties of the obtained silicon oxide-coated soft magnetic powders are shown in Table 1-2.

TABLE 1-1

| | $SiO_2$ film thickness | HE (μm) | | | MT (μm) | | | TAP density | Coverage ratio | Volume resistivity | D50(HE)/ | Tap density/ D50 (MT) ((g/cm³)/ | Weather |
|---|---|---|---|---|---|---|---|---|---|---|---|---|---|
| | (nm) | D10 | D50 | D90 | D10 | D50 | D90 | (g/cm³) | (%) | (μΩ · cm) | D50(MT) | μm) | resistance |
| Original powder of Example 1 | — | 1.41 | 3.16 | 5.11 | 1.84 | 3.17 | 5.18 | 4.0 | 0 | $1.6 \times 10^4$ | 1.00 | 1.3 | — |
| Example 1 | 5 | 1.58 | 3.28 | 5.29 | 1.96 | 3.22 | 4.97 | 4.0 | 87 | $5.7 \times 10^8$ | 1.02 | 1.2 | A |
| Example 2 | 10 | 1.61 | 3.31 | 5.32 | 1.95 | 3.25 | 5.30 | 3.9 | 92 | $3.1 \times 10^9$ | 1.02 | 1.2 | A |
| Example 3 | 19 | 1.69 | 3.37 | 5.38 | 2.06 | 3.41 | 5.68 | 3.8 | 98 | $1.1 \times 10^{10}$ | 0.99 | 1.1 | A |
| Comparative Example 1 | 6 | 1.47 | 3.21 | 5.16 | 7.55 | 11.07 | 15.81 | 2.7 | 81 | $5.5 \times 10^8$ | 0.29 | 0.2 | B |
| Comparative Example 2 | 10 | 1.74 | 3.36 | 5.35 | 10.37 | 14.18 | 19.67 | 2.3 | 90 | $4.6 \times 10^8$ | 0.24 | 0.2 | A |
| Comparative Example 3 | 17 | 2.14 | 4.05 | 6.96 | 12.14 | 16.37 | 22.64 | 2.0 | 98 | $3.4 \times 10^9$ | 0.25 | 0.1 | A |
| Comparative Example 4 | 9 | 1.55 | 3.24 | 5.15 | 1.88 | 3.30 | 5.17 | 4.0 | 65 | $4.2 \times 10^8$ | 0.98 | 1.2 | B |
| Example 4 | 10 | 1.48 | 3.23 | 5.16 | 1.72 | 3.50 | 6.52 | 3.6 | 88 | $2.1 \times 10^9$ | 0.92 | 1.0 | A |
| Original powder of Example 5 | — | 1.76 | 4.65 | 10.16 | 1.75 | 4.60 | 10.07 | 3.8 | 0 | $9.5 \times 10^1$ | 1.01 | 0.8 | — |
| Example 5 | 10 | 1.85 | 4.63 | 10.32 | 2.10 | 4.98 | 12.10 | 3.8 | 93 | $1.3 \times 10^{10}$ | 0.93 | 0.8 | A |
| Comparative Example 5 | 10 | 1.89 | 4.89 | 10.67 | 7.26 | 12.54 | 19.06 | 2.7 | 89 | $9.6 \times 10^9$ | 0.39 | 0.2 | A |
| Original powder of Example 6 | — | 0.68 | 1.58 | 2.81 | 0.68 | 1.58 | 2.82 | 4.1 | 0 | $3.3 \times 10^1$ | 1.00 | 2.6 | — |
| Example 6 | 10 | 0.77 | 1.64 | 2.83 | 0.81 | 1.73 | 2.86 | 4.0 | 95 | $3.6 \times 10^9$ | 0.95 | 2.3 | A |
| Comparative Example 6 | 10 | 1.12 | 2.38 | 3.78 | 5.06 | 9.02 | 10.86 | 2.3 | 93 | $3.4 \times 10^9$ | 0.26 | 0.3 | A |
| Original powder of Example 7 | — | 1.87 | 4.88 | 12.41 | 1.90 | 5.05 | 12.61 | 3.9 | 0 | $4.1 \times 10^0$ | 0.97 | 0.8 | — |
| Example 7 | 10 | 1.95 | 4.89 | 12.52 | 1.99 | 5.09 | 12.88 | 3.7 | 92 | $2.4 \times 10^{10}$ | 0.96 | 0.7 | A |
| Comparative Example 7 | 10 | 2.10 | 5.17 | 13.65 | 8.24 | 12.95 | 24.82 | 2.4 | 91 | $6.1 \times 10^8$ | 0.40 | 0.2 | A |

TABLE 1-2

| | $SiO_2$ film thickness (nm) | HE (μm) D10 | HE (μm) D50 | HE (μm) D90 | MT (μm) D10 | MT (μm) D50 | MT (μm) D90 | TAP density (g/cm³) | Coverage ratio (%) | Volume resistivity (μΩ · cm) | D50(HE)/ D50(MT) | Tap density/ D50 (MT) ((g/cm³)/ μm) | Weather resistance |
|---|---|---|---|---|---|---|---|---|---|---|---|---|---|
| Original powder of Example 8 | — | 0.71 | 1.60 | 2.78 | 0.86 | 2.02 | 4.43 | 4.1 | 0 | $1.8 \times 10^0$ | 0.79 | 2.0 | — |
| Example 8 | 5 | 0.78 | 1.62 | 2.81 | 0.85 | 1.95 | 3.90 | 3.5 | 86 | $3.6 \times 10^9$ | 0.83 | 1.8 | A |
| Example 9 | 10 | 0.77 | 1.66 | 2.88 | 0.84 | 2.00 | 4.24 | 3.5 | 96 | $4.5 \times 10^9$ | 0.83 | 1.7 | A |
| Example 10 | 20 | 0.79 | 1.66 | 2.86 | 0.87 | 2.06 | 4.78 | 3.4 | 98 | $5.2 \times 10^9$ | 0.81 | 1.7 | A |
| Comparative Example 8 | 5 | 0.91 | 2.09 | 3.71 | 4.46 | 6.01 | 7.73 | 2.4 | 81 | $2.1 \times 10^9$ | 0.35 | 0.4 | A |
| Comparative Example 9 | 10 | 1.50 | 3.43 | 5.93 | 7.42 | 10.28 | 13.48 | 2.2 | 94 | $2.0 \times 10^9$ | 0.33 | 0.2 | A |
| Comparative Example 10 | 20 | 1.93 | 3.95 | 6.14 | 9.65 | 12.34 | 15.74 | 1.8 | 97 | $1.0 \times 10^9$ | 0.32 | 0.1 | A |
| Original powder of Example 11 | — | 1.79 | 4.10 | 7.69 | 1.79 | 4.11 | 7.82 | 4.2 | 0 | $1.7 \times 10^{-1}$ | 1.00 | 1.0 | — |
| Example 11 | 5 | 1.80 | 4.12 | 7.70 | 1.93 | 4.16 | 7.75 | 4.0 | 88 | $1.6 \times 10^9$ | 0.99 | 1.0 | A |
| Example 12 | 11 | 1.84 | 4.15 | 7.68 | 2.02 | 4.25 | 8.21 | 3.9 | 98 | $1.2 \times 10^9$ | 0.98 | 0.9 | A |
| Example 13 | 20 | 1.90 | 4.20 | 7.82 | 2.20 | 4.35 | 8.68 | 3.8 | 99 | $1.2 \times 10^9$ | 0.97 | 0.9 | A |
| Comparative Example 11 | 5 | 1.85 | 4.11 | 7.77 | 5.63 | 10.02 | 13.33 | 2.8 | 85 | $8.7 \times 10^8$ | 0.41 | 0.3 | A |
| Comparative Example 12 | 11 | 1.90 | 4.11 | 7.73 | 8.19 | 11.46 | 16.16 | 2.6 | 98 | $8.5 \times 10^8$ | 0.36 | 0.2 | A |
| Comparative Example 13 | 19 | 2.55 | 5.20 | 7.80 | 9.65 | 14.35 | 20.73 | 2.3 | 99 | $1.3 \times 10^9$ | 0.36 | 0.2 | A |

REFERENCE SINGS LIST

1 Reaction vessel and reaction liquid
2 Disperser
3 Circulation pump
4 Flow of reaction liΩΩuid
5 Stirring motor
6 Stirring blade

The invention claimed is:

1. A silicon oxide-coated soft magnetic powder, in which the surface of a soft magnetic powder containing 20 mass % or more of iron is coated with silicon oxide, wherein when a volume-based cumulative 50% particle diameter obtained by a laser diffraction particle size distribution analysis in a state where the silicon oxide-coated soft magnetic powder is dispersed in a gas under the condition of 0.5 MPa is represented by D50 (HE) and a volume-based cumulative 50% particle diameter obtained by a laser diffraction/scattering particle size distribution analysis in a state where the silicon oxide-coated soft magnetic powder is dispersed in pure water is represented by D50 (MT), the D50 (HE) is 0.1 um or more and 10.0 um or less and D50 (HE)/D50 (MT) is 0.7 or more, and the coverage ratio R of a silicon oxide coating layer defined by the following formula (1) is 70% or more, wherein the silicon dioxide is a silanol derivative and the soft magnetic powder does not contain rare-earth elements:

$$R=Si\times100/(Si+M) \quad (1)$$

wherein Si is a molar fraction of Si obtained by X-ray photoelectron spectroscopy (XPS) measurement for the silicon oxide-coated soft magnetic powder, and M is the sum of molar fractions obtained by XPS measurement for metal elements and non-metal elements excluding oxygen among the elements constituting the soft magnetic powder, wherein an average film thickness of the silicon oxide coating layer is 1 nm or more and 30 nm or less, a tap density of the silicon oxide-coated soft magnetic powder is 3.0 (g/cm³) or more and 5.0 (g/cm³) or less, and a ratio of the tap density to the D50 (MT) (tap density (g/cm³)/D50 (MT) (μm)) is 0.5 (g/cm³)/(μm) or more and 5.0 (g/cm³)/(μm) or less.

* * * * *